(12) United States Patent
Brauchle

(10) Patent No.: US 8,200,361 B2
(45) Date of Patent: Jun. 12, 2012

(54) CONTROL OF A MACHINING TOOL

(75) Inventor: Thomas Brauchle, Leonberg (DE)

(73) Assignee: Trumpf Laser- und Systemtechnik GmbH, Ditzingen (DE)

( * ) Notice: Subject to any disclaimer, the term of this patent is extended or adjusted under 35 U.S.C. 154(b) by 721 days.

(21) Appl. No.: 12/300,291

(22) PCT Filed: May 3, 2007

(86) PCT No.: PCT/EP2007/003900
§ 371 (c)(1),
(2), (4) Date: Mar. 16, 2009

(87) PCT Pub. No.: WO2007/131641
PCT Pub. Date: Nov. 22, 2007

(65) Prior Publication Data
US 2009/0271025 A1    Oct. 29, 2009

(30) Foreign Application Priority Data

May 11, 2006  (DE) .......................... 10 2006 022 304

(51) Int. Cl.
*G06F 19/00* (2006.01)
(52) U.S. Cl. ......... 700/180; 700/228; 700/112; 700/166
(58) Field of Classification Search ................. 700/112, 700/166, 180, 228
See application file for complete search history.

(56) References Cited

U.S. PATENT DOCUMENTS

| | | | |
|---|---|---|---|
| 4,321,679 A * | 3/1982 | Fujie et al. .................... | 700/192 |
| 4,541,055 A * | 9/1985 | Wolfe et al. .................... | 700/166 |
| 4,959,840 A | 9/1990 | Akins et al. | |
| 5,914,883 A * | 6/1999 | Riva et al. ..................... | 700/181 |
| 6,061,605 A | 5/2000 | Davis | |
| 6,618,425 B1 * | 9/2003 | Carlesi et al. ................. | 372/109 |

FOREIGN PATENT DOCUMENTS

| | | |
|---|---|---|
| DE | 10024316 | 11/2001 |
| EP | 0786841 | 7/1997 |
| EP | 0901865 | 3/1999 |

(Continued)

OTHER PUBLICATIONS

International Search Report from corresponding PCT Application No. PCT/EP2007/003900, mailed Sep. 3, 2007, 3 pages.
International Preliminary Report on Patentability and translation of the Written Opinion for corresponding PCT Application No. PCT/EP2007/003900, mailed Dec. 10, 2008, 6 pages.

*Primary Examiner* — Kakali Chaki
*Assistant Examiner* — Sheela S Rao
(74) *Attorney, Agent, or Firm* — Fish & Richardson P.C.

(57) ABSTRACT

The invention relates to a method for distributed control of a machining tool (24), in particular a laser machining tool, which comprises a machining area (31) which is surrounded by a protective housing (22) and has at least one area (27, 28) for access to the machining area (31) which is monitored, and comprising a control which is operated by at least one operator panel (21) to start the machining tool (24), wherein the machining tool is controlled by means of one or more multifunction keys (16), and at least one multifunction key (16) is associated with the at least one access area (27, 28), and when the respective multifunction key is pressed, (16) a work step of an operating sequence for the machining tool (24) is actuated which is next in a repetitive sequence of consecutive work steps of the operating sequence.

23 Claims, 3 Drawing Sheets

FOREIGN PATENT DOCUMENTS

| | | |
|---|---|---|
| GB | 2117928 A | 10/1983 |
| JP | 7229596 A | 8/1995 |
| JP | 1147950 | 2/1999 |
| WO | 0137457 | 5/2001 |

* cited by examiner

CONTROL OF A MACHINING TOOL

TECHNICAL FIELD

The invention relates to a method for decentralized control of a machine tool, particularly a laser machine tool.

BACKGROUND

A machine tool of this kind, particularly a laser machine tool, is known from the machine tool Lasercell 1005 from Trumpf, Inc. A machine tool of this kind has a machining compartment which is surrounded by a protective housing. The protective housing contains at least one access region for the machining compartment, which is monitored. Arranged outside the protective housing is a main control panel which allows the machine tool to be controlled. This main control panel comprises a Teachpanel, which can be used to input both basic functions and auxiliary functions. Provided in decentralized fashion with respect to the main control panel, for the purposes of opening and closing protective doors, are individual control elements which comprise individual control keys in line with the assignment of the regions. For example, an automatic protective door for an access region is provided with a control key for opening the door, a control key for closing the door, a control key for operating a light in a protective housing, a control key for an emergency off function and a control key for acknowledging a loaded workpiece transporting apparatus in the machining compartment outside the protective housing.

Such machine tools are loaded and unloaded with workpieces by means of workpiece transporting apparatuses, the workpieces moving from the machining compartment through a separate access region out of a loading compartment outside the machine tool into the machining compartment inside the protective housing. This access region in turn has a further control element associated with it which, in contrast to the aforementioned control element, comprises other control keys.

These known control elements allow all the functions for controlling a machine tool. However, the machine operator needs to select a control key and operate a respective control element for each requisite work step at the location of the work step which is to be performed. This arrangement of the control elements requires a specific instruction on each control element on the basis of the state of the machine tool. Furthermore, the machine operator needs to initiate the individual control steps at the respective location of what is happening.

SUMMARY

The invention is therefore based on the object of providing a method for the decentralized control of a machine tool in which the actuation is simplified and the control elements for the decentralized control are harmonized.

The invention achieves the object by means of a method for the decentralized control of a machine tool in accordance with the features of claim 1. Further advantageous refinements and developments of the invention are specified in the further dependent claims.

The method according to the invention has the advantage that for the decentralized control of a machine tool a standard multifunction pushbutton is provided on the access region(s) of the machine tool, so that it is a simple matter for consecutive work steps to be actuated by the multifunction pushbutton. In this case, the respective operation of the multifunction pushbutton involves a work step in the control cycle for the machine tool being actuated which is next in line in a repetitive sequence of consecutive work steps in the control cycle. This executes a chain of consecutive work steps. Furthermore, the standard configuration of the multifunction pushbutton also allows actuation of an access region which is provided remotely but in visible range of the machine operator. This can allow reduced process times on the basis of faster control.

The multifunction key can successively actuate the consecutive work steps of a control cycle which is stipulated for each mode of operation of the machine tool. This means that the typical or regularly recurring work steps control a specific control cycle for every mode of operation. The machine tool is preferably controlled in the modes of operation "machining a workpiece" and "setting up a machine tool" by means of the multifunction pushbutton.

In one embodiment of the method, in the "machining a workpiece" mode of operation a machining program is interrupted by operating the multifunction pushbutton. It is no longer necessary to identify a current work state for the machine tool during the interruption of the work process and, as a result, for the machine operator to actuate or operate an appropriate control element to return to the work process and continue it.

So that the machine operator is informed about the current state of the machine tool in the control cycle, the multifunction pushbutton can take the current operating state of the machine tool as a basis for outputting a state signal, such as a steady light, a flashing light or a plurality of flashing lights at different frequencies, or extinction of the steady light. This allows the machine operator to identify a current work step in the control cycle or the current operating state of the machine tool. The one or more multifunction pushbutton(s) can indicate(s) the machining of a workpiece in the "machining a workpiece" mode of operation by means of a first state signal, the first state signal preferably being in the form of a steady light.

According to one refinement of the method according to the invention, operating the multifunction pushbutton during the machining of the workpiece in the "machining a workpiece" mode of operation interrupts the machining program and preferably stops the machining unit by slowing down linear axles, turns off a laser beam and activates a feed inhibit.

The interruption of the machining program can be indicated on the multifunction pushbutton by a change in the first state signal. This allows the machine operator to identify a current work step in the control cycle or the current operating state of the machine tool.

Since the machining compartment of the machine tool is normally protected for safety reasons, provision can be made for operation of the multifunction pushbutton to involve the machining compartment being rendered accessible in addition to the machining program being interrupted. In the case of manual protective doors, a lock on the protective doors is unlocked on the protective housing, or in the case of automatic protective doors, the protective doors are opened on the protective housing, or the in the case of monitoring of the access region, for example by light barriers, the monitoring is deactivated. These work steps are executed in succession and represent a control cycle to render the machining compartment of a machine tool accessible and to check the cause of the initiated interruption.

In one refinement of the method, the access region of the machine tool is protected by automatic protective doors or monitoring by light barriers or a light curtain. An interruption of the machining program and the accessibility of the machining compartment are indicated to the machine operator preferably by extinction of the first state signal, preferably the steady light, on the multifunction pushbutton. This informs the machine operator that the consecutive work steps for interrupting the machining program have been executed and the machining compartment is accessible without risk.

When the cause of the interruption to the machining program has been checked and cleared up, provision can be made for operation of the multifunction pushbutton to initiate a work step in order to return to the interrupted machining program, wherein automatic closure of the automatic protective doors or locking of the manual protective doors or activation of the monitoring of the access region is actuated.

This successfully performed work step can be indicated by a second state signal, which can be in the form of a flashing light, on the multifunction pushbutton. This simultaneously ensures a check for the completely executed work step.

In one refinement of the method, the access region of the machine tool is protected by manual protective doors. The interruption of the machining program and the unlocking of the manual protective doors are preferably indicated by a second state signal from the multifunction pushbutton, particularly a flashing light. The second state signal from the multifunction pushbutton is extinguished when at least one manual protective door is opened, so that the machine operator knows that the machining compartment is accessible.

To continue the machining program, the at least one opened manual protective door is closed and then the manual protective doors are locked by operating the multifunction pushbutton.

The multifunction pushbutton indicates the locking of the manual protective doors by means of the second state signal, particularly the flashing light. This allows the machine operator to identify the current work step in a control cycle or the current operating state of the machine tool.

After a flashing light is indicated on the multifunction pushbutton, the machine tool can be activated by operating the multifunction pushbutton again to continue the machining program. The machining program continues its further machining at the point at which the interruption of the machining program was initiated.

From the time at which the continuation of the machining program was initiated onward, the flashing light on the multifunction pushbutton can be transformed into a steady light. This indicates that the machining program is being executed routinely.

After one or more workpieces positioned in the machining compartment have been machined completely, a change of workpiece is required. This change of workpiece is a machine step within the machining program in the "machining the workpiece" mode of operation or can be performed manually by the machine operator.

In accordance with one refinement of the method, the change of workpiece in the machining compartment is indicated on the multifunction pushbutton by a change in the first state signal, for example, extinction of the steady light. This again notifies the machine operator about the current status.

Workpieces can be loaded and unloaded by means of a workpiece transporting apparatus. The workpiece is changed by virtue of at least one access region of the machine tool being enabled, so that the workpiece transporting apparatus is moved from a loading compartment into the machining compartment. If two loading compartments are provided, a workpiece transporting apparatus is moved from the machining compartment into a first loading compartment and a workpiece transporting apparatus is moved from a second loading compartment into the machining compartment, for example.

When the workpiece transporting apparatus has been moved, the access region is activated. Subsequently, the as yet unmachined workpieces can be machined again.

During the change of workpiece, operating the multifunction pushbutton can allow the at least one workpiece transporting apparatus to be stopped and operating the multifunction pushbutton again can allow it to be restarted.

In addition, provision can be made for the work steps of moving the workpiece carrier apparatus from the loading compartment into the machining compartment or moving it from the machining compartment into the loading compartment to be controlled in the "setting of a machine tool" mode of operation by operation of the multifunction pushbutton.

As additional work steps, provision can be made for opening and closure of the access region to be controlled by operating the multifunction pushbutton. This provides consecutive work steps for the control cycle which allows there to be good accessibility to the machining compartment by the machine operator for the purpose of setting up the machine tool.

For the purpose of simple and ergonomic operation of a machine tool of this kind, provision can also be made for the individual consecutive work steps, which are initiated in decentralized fashion by one or more multifunction pushbuttons or centrally on the main control panel, to be synchronized to one another, so that the same step is actuated on each multifunction pushbutton and the main control panel upon request. Such synchronization provides the machine operator with a free selection for operating one of a plurality of multifunction pushbuttons provided for the machine tool.

The invention and further advantageous embodiments and developments thereof are described and explained in more detail below using the examples illustrated in the drawings. The features which can be found in the description and in the drawings can be applied individually on their own or severally in any combination, in line with the invention.

DETAILED DESCRIPTION

Figure 1:
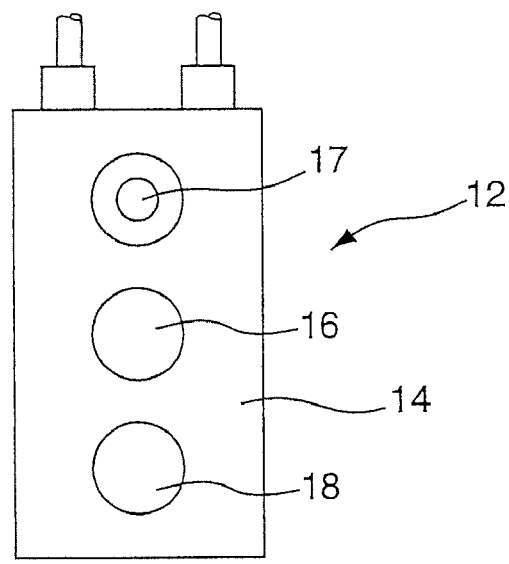
FIG. 1 is a schematic view of a decentralized control element.

FIG. 1 shows a schematic view of a control element 12 which comprises a housing or at least one mounting plate 14. This mounting plate 14 contains a multifunction pushbutton 16, an emergency off switch 17 and an acknowledgement pushbutton 18. These three pushbuttons 16, 17, 18 can be designed to be of different colors. The emergency off switch 17 is in the form of a red switch with a yellow background, the acknowledgement pushbutton 18 is in the form of a green pushbutton and the multifunction pushbutton 16 is in the form of a blue illuminated pushbutton.

Figure 2:
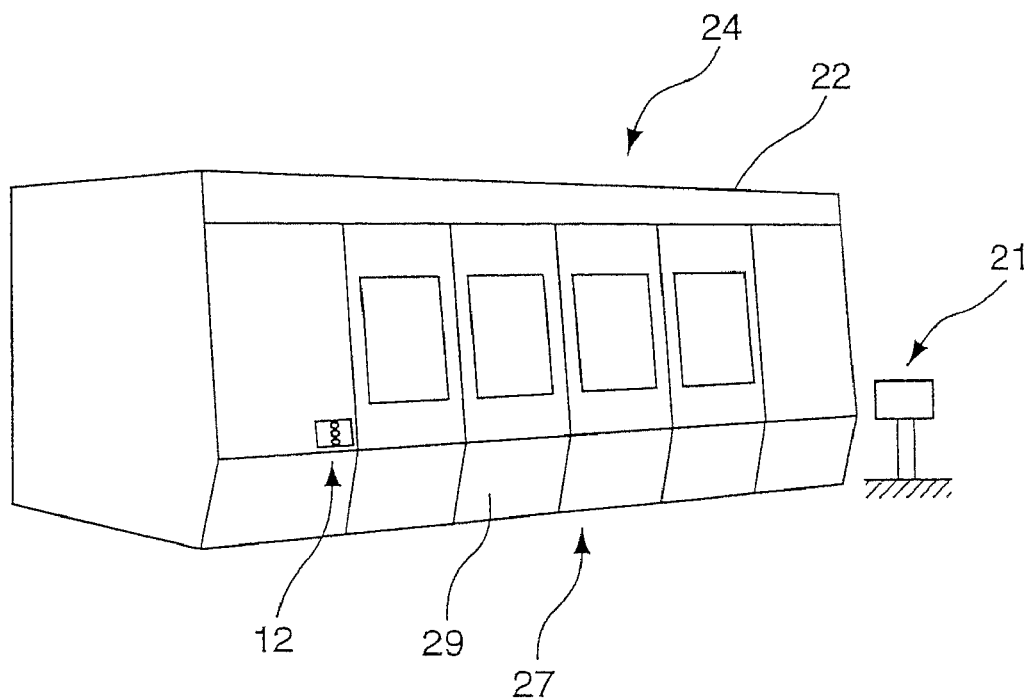
FIG. 2 is a perspective view of a machine tool with a protective housing and manual protective doors.

FIG. 2 shows a machine tool 24 with a protective housing 22, wherein the protective housing 22 is accessible by an access region 27. The access region 27 is formed by manually movable protective doors 29, which are shown in the closed state in FIG. 2. A control element 12 is arranged in decentralized fashion with respect to a main control panel 21 on the protective housing 22 of the machine tool 24. If the control element 12 is provided as a built-in component, this comprises an mounting plate 14 which is fitted flush with the protective housing 22. Alternatively, a housing which is attached to the protective housing 22 may also be provided.

In one embodiment of a machine tool 24, provision may be made for only one control element 12 to be associated with the access region 27. In the case of such an embodiment, the protective doors 29 are designed for opening and closing manually. However, the proactive doors 29 are unlocked and locked automatically, and this is monitored.

Figure 3:
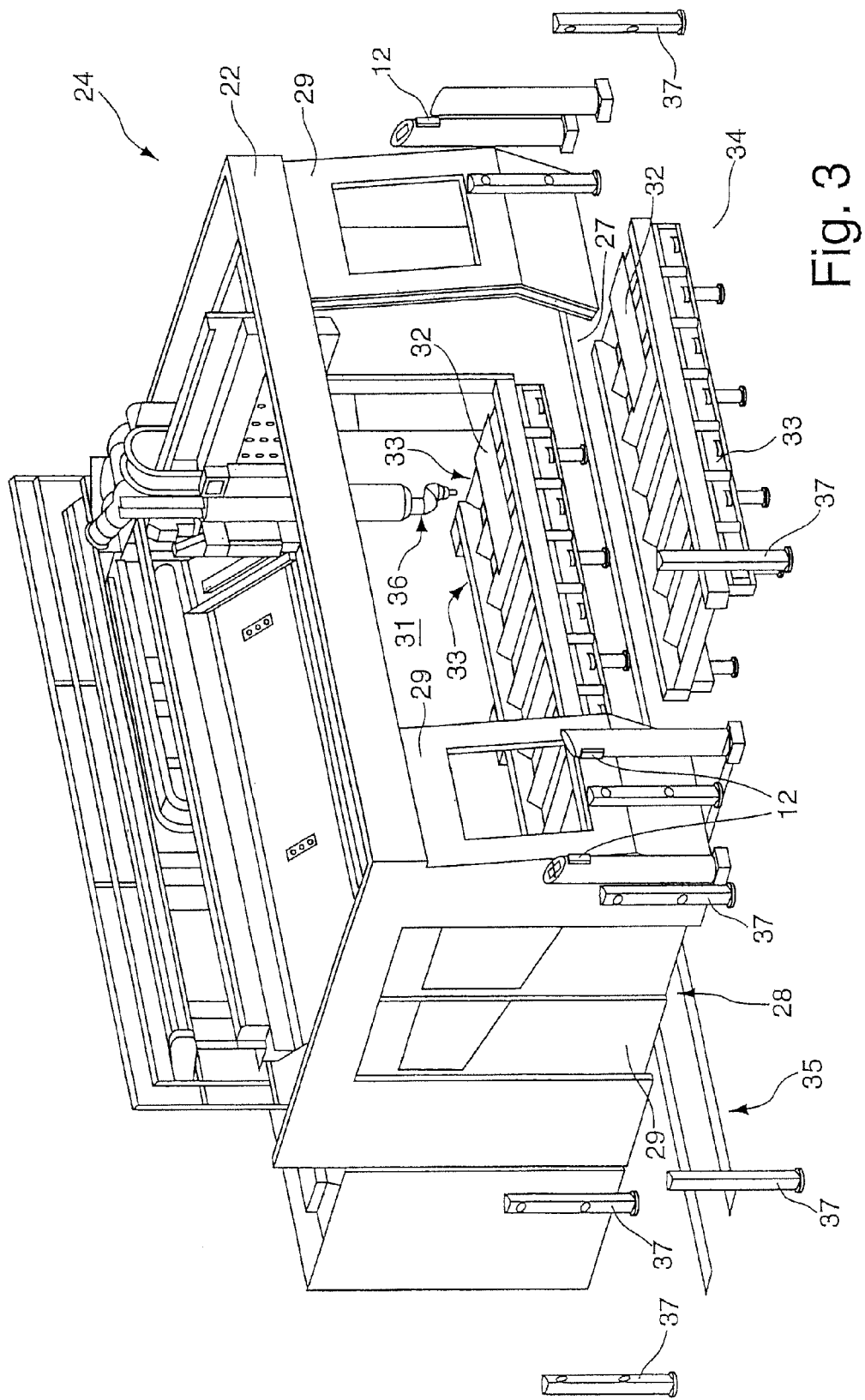
FIG. 3 is a perspective view of a machine tool with automatic protective doors and a pallet changer as a workpiece transporting apparatus.

The method according to the invention for the decentralized control of the machine tool is described in more detail below with reference to a machine tool as shown in FIG. 3.

FIG. 3 shows a machine tool 24 with automatic protective doors 29 and automation of the loading and unloading processes for the workpieces. The machine tool 24 is in the form of a laser machine tool and comprises a machining compartment 31 which is surrounded by the protective housing 22. The access region 27 is formed by two automatically movable protective doors 29, which are depicted in the open state in FIG. 3. Each automatically movable protective door 29 has an associated control element 12 with a multifunction pushbutton 16. The control elements 12 are integrated in upright columns 30 which are arranged in front of the protective doors 29.

The machining compartment 31 has a workpiece transporting apparatus 33 positioned in it which is in the form of a pallet changer for the purpose of automating the loading and unloading processes for the workpieces. The workpiece transporting apparatus 33 is a workbench for holding workpieces, with the touch of a button prompting the workbench to be moved between a loading and unloading position outside the protective housing 22 and a machine position within the protective housing 22. The machine tool 24 comprises a first loading compartment 34, which is arranged on a front of the protective housing 22, and a second loading compartment 35, which is arranged on a side of the protective housing 22. This arrangement allows a machine operator to unload a workpiece whose machining is finished in the loading compartment 34, 35 and to load an unmachined workpiece onto the workpiece transporting apparatus 33 while the workpiece 32 is being machined in the machining compartment 31.

Depending on the size and flexibility of the machine tool 24, one or more loading compartments 34, 35 may be provided. The loading compartments 34, 35 are protected by a light barrier, the loading compartments 34, 35 being limited by four columns 37 which incorporate the light barriers. The light barriers are activated by means of the acknowledgement pushbutton 18 at the control element 12. Alternatively, the loading compartments 34, 35 may be protected by a light curtain.

The machining compartment 31 contains, as a machining unit 36, a laser cutting head or a laser welding head, for example, which can be moved by means of a linear axle system above the workpiece transporting apparatus 33.

A machine tool can be operated in various modes of operation. By way of example, these include the modes of operation "machining a workpiece", "setting up a machine tool", "maintaining a machine tool" and "diagnosis".

A workpiece is machined in line with a machining program in the "machining a workpiece" mode of operation. The machine operator programs the machining program, which sends commands to the machine controller upon starting. In the "machining a workpiece" mode of operation, many commands are produced automatically on the basis of the selected machining program. The function of the multifunction pushbutton 16 is to allow the machining program to be safely interrupted and allow the interruption to be controlled by means of the multifunction pushbutton 16.

In the "setting up a machine tool" mode of operation, the machine operator can set up the machine tool for machining. This includes activities such as aligning a laser beam, adjusting an interval control or inserting a workpiece support.

Workpieces are machined in the "machining a workpiece" mode of operation. To machine the workpiece 32 which is located in the machining compartment 31, the machining program is started using the main control panel 21. The multifunction pushbutton 16 uses a steady light to indicate that the machining unit 36 has been activated and the machining program is being executed.

A lit acknowledgement pushbutton 18 indicates to the machine operator that a change of workpiece is required on the workpiece transporting apparatus 33 which is positioned in the loading compartment 34. While the workpiece 32 is being machined in the machining compartment 31, the machine operator changes the workpiece in the loading compartment 34, a workpiece which has finished being machined is removed from the workpiece transporting apparatus 33 and a new, unmachined workpiece is inserted into the workpiece transporting apparatus 33. By pushing the acknowledgement pushbutton 18, the machine operator confirms the change of workpiece in the loading compartment 34.

After the workpiece 32 has been machined, the machining unit 36 is stopped and the machining program is terminated. The controller for the machine tool 24 is used to change the workpiece transporting apparatus 33. The access regions 27, 28 are opened, the workpiece transporting apparatus 33 is moved out of the machining compartment 31 into the loading compartment 35, and the workpiece transporting apparatus 33 is moved out of the loading compartment 34 into the machining compartment 31. Next, the protective doors 29 are closed, so that the access regions 27, 28 are sealed, and the machining unit 36 starts to machine the next workpiece as a result of the machining program being started.

The interruption of the machining to change a workpiece is indicated by the multifunction pushbutton 16 by virtue of the steady light being extinguished. As soon as the machining program is continued after the workpiece has been changed, the multifunction pushbutton 16 indicates a steady light again.

Should it become necessary to access the machining compartment 31 while the workpiece 32 is being machined, the machining program can be interrupted by operating the multifunction pushbutton 16. The multifunction pushbutton 16 can be used to actuate consecutive work steps in a control cycle which are required in order to safely interrupt the machining of the workpiece 32 and to subsequently continue the machining.

By operating the multifunction pushbutton 16, the machining unit 36 is stopped by slowing down the linear axles, a laser beam is switched off and a feed inhibit is activated. In addition, the protective door 29 associated with the operated multifunction pushbutton 16 is opened. The machine operator can enter the machining compartment 31 and correct the fault. When the fault has been corrected, the open protective door 29 can be closed by operating the multifunction pushbutton 16. Further operation of the multifunction pushbutton 16 continues the machining program at the point at which the machining program was previously interrupted.

The multifunction pushbutton 16 indicates the various states of the machine tool 24 during the interruption by means of different state signals. The interruption of the machining program and the opening of the protective door 29 are indicated by virtue of the steady light on the multifunction pushbutton 16 being extinguished. When the fault has been corrected and the protective door 29 has been closed, the multifunction pushbutton 16 indicates a flashing light which signals to the machine operator that further action is required in order to continue the machining. Pushing the multifunction pushbutton 16 again activates the machining unit 36 and continues the machining program, and the multifunction pushbutton 16 changes from the flashing light to a steady light.

When the machine tool 24 has a protective housing 22 with protective doors 29 which need to be opened manually, it is possible, following an interruption to the machining program as a result of the multifunction pushbutton 16 being operated, for stopping of the machine unit 36 and unlocking of the protective doors 29 to be indicated by a steady light changing to a flashing light on the multifunction pushbutton 16. This indicates to the machine operator that the machining compartment 31 is accessible.

In the "setting up a machine tool" mode of operation, a different sequence of repetitive work steps is stored on the multifunction pushbutton 16.

The workpiece transporting apparatus 33 may be positioned in the loading compartment 34, 35 or in the machining compartment 31.

Operating the multifunction pushbutton 16 opens the protective doors 29, further operation of the multifunction pushbutton 16 moves the workpiece transporting apparatus 33 out of the loading compartment 34, 35 into the machining compartment 31 or out of the machining compartment 31 into the loading compartment 34, 35, and further operation of the multifunction pushbutton 16 closes the protective doors 29 again.

Thus, only operation of the multifunction pushbutton 16 initiates a control cycle of consecutive work steps, which comprises a typical sequence of consecutive work steps, with incorrect operation being prevented. In this case, both the type and number of work steps from interrupting the work process to stopping the machine tool and the type and number of work steps for continuing the interrupted work process may be altered, increased and also configured differently from one another in comparison with the exemplary embodiments.

Figure 4:
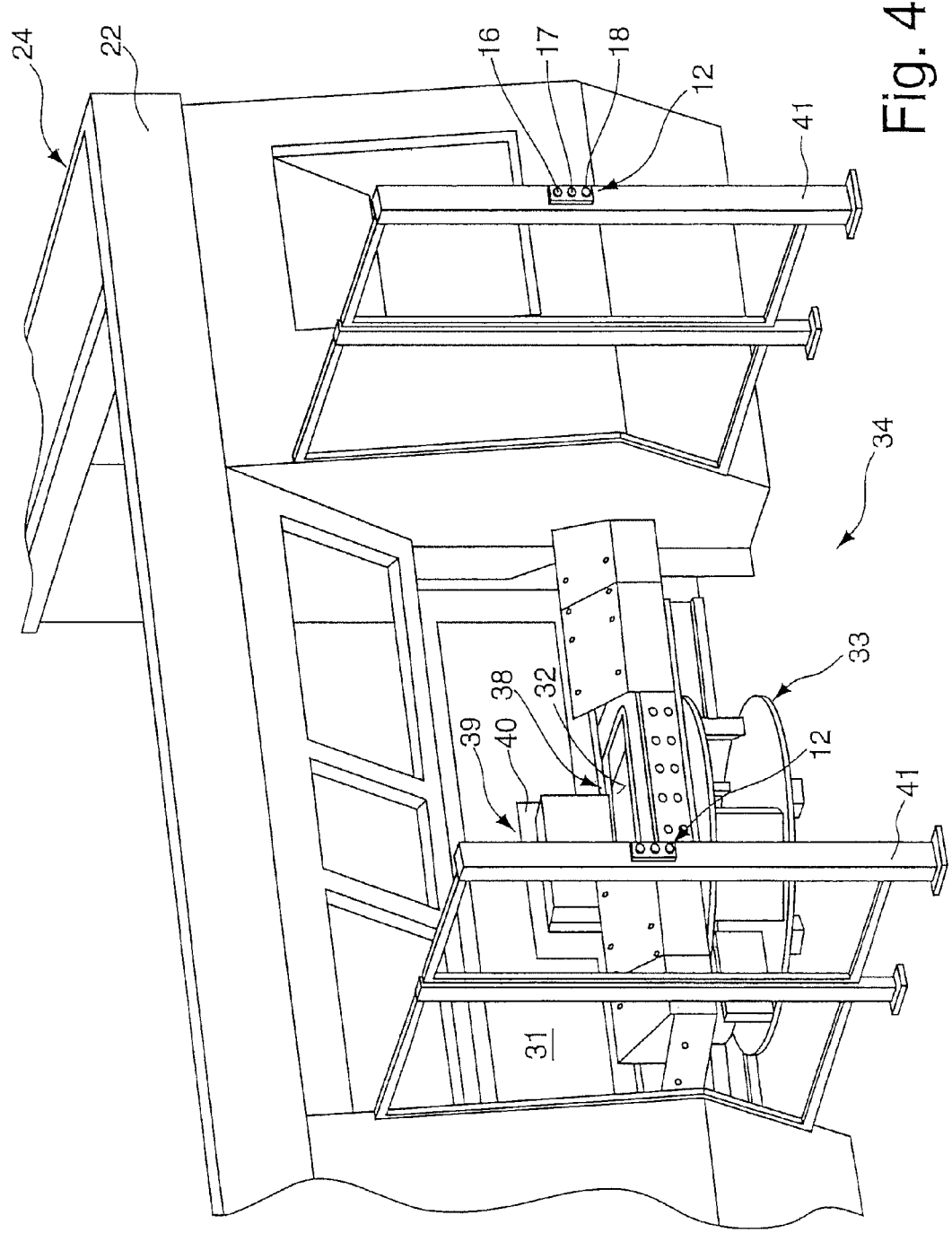
FIG. 4 is a perspective view of a machine tool with a rotary changer as a workpiece transporting apparatus.

FIG. 4 shows a machine tool 24 in similar fashion to FIG. 3, the machine tool being distinguished in that the workpiece transporting apparatus 33 is formed by a rotary changer instead of a pallet changer. A rotary changer of this kind has two or more stations in which the workpieces are positioned. The workpiece transporting apparatus 33 shown in FIG. 4 is a rotary changer having two stations, a loading and unloading station 38 and a machining station 39. The loading and unloading station 38 is isolated from the machining station 39 by a protective wall 40. The workpiece whose machining is finished is rotated out of the machining station 39 into the loading and unloading station 38 and can be unloaded in the loading and unloading station 38. the loading and unloading station 38 is loaded with an unmachined workpiece. Next, the change of workpiece effected in the loading and unloading station 38 is confirmed on the upright column 41 and the exiting of the access region 27 is confirmed by the acknowledgement pushbutton 18. Alternatively, respective confirmation can be requested for the change of workpiece effected and the exiting of the loading and unloading station 38. The access region 27 is activated and a machining program is started.

The actuation of such a workpiece transporting apparatus 33 corresponds, in principle, to the control described for FIG. 3. Instead of moving the pallet changer into and out of the loading compartment, 34, 35, there is a rotary movement of the rotary changer in order to allow the workpieces to be transported on from the loading and unloading station 38 to the downstream machining station 39.

As an alternative to the access regions 27, 28 shown in FIG. 3, which are sealed by protective doors 29, an access region 27 is provided in FIG. 4 which is protected by means of a light barrier. This light barrier or a light curtain is integrated in upright columns 41, which likewise hold control elements 12 and are part of the protective housing 22.

On the basis of the synchronization of the main control panel 21 with one or more control elements 12 provided in decentralized fashion with respect to the main control panel 21, the actuation can take place both on the main control panel 21 and on the control elements 12.

The control elements 12 for decentralized actuation may be provided on the protective housing 22 or on the separate columns 37, 41. In addition, it is possible for such a control element 12 to be in the form of an autarkic mobile radio which the machine operator carries, so that he can perform actuation regardless of his position relative to the machine tool 24.

A machine tool is equipped as standard with a particular method for decentralized control which can be called using the multifunction pushbutton 16 in the "machining a workpiece" and "setting of a machine tool" modes of operation. At the request of a customer, the multifunction pushbutton 16 can also be programmed with an individual sequence of work steps.

All features described above are each independently fundamental to the invention and can be combined with one another as desired.

The invention claimed is:

1. A method for the decentralized control of a machine tool that comprises: a machining compartment that is surrounded by a protective housing and has at least one access region that is monitored; a controller that is controlled from a main control panel to start the machine tool and to actuate a work step; and one or more control elements decentralized from the main control panel, the method comprising:

controlling the machine tool using the main control panel and the one or more control elements, each control element having a multifunction pushbutton, wherein at least one control element is associated with the at least one access region; and actuating a work step that is next in line in a repetitive sequence of consecutive work steps in a control cycle by operating the multifunction pushbutton, wherein the repetitive sequence of consecutive worksteps is synchronized with operation of the multifunction pushbutton and operation of the main control panel, such that operating either the main control panel or the multifunction pushbutton actuates the same successive work step in the sequence of consecutive work steps.

2. The method of claim 1, further comprising:

operating the machine tool in at least one mode of operation, and for each mode of operation storing a predetermined sequence of consecutive work steps for the control cycle, the sequence being actuated by the multifunction pushbutton.

3. The method of claim 1, further comprising operating the machine tool in a "machining a workpiece" mode of operation, and interrupting the machining of the workpiece when the multifunction pushbutton is operated.

4. The method of claim 1, further comprising operating the machine tool in a "machining a workpiece" mode of operation, and indicating with the one or more multifunction pushbuttons that a workpiece is being machined by outputting a first state signal.

5. The method of claim 4, further comprising indicating the interruption of the machining in the "machining a workpiece" mode of operation by changing the first state signal output from the multifunction pushbutton.

6. The method of claim 4, further comprising indicating interruption of a machining program for a change of workpiece on the multifunction pushbutton by a change in the output of the first state signal.

7. The method of claim 6, wherein the change in the output of the first state signal is an extinction of the first state signal.

8. The method of claim 1, further comprising operating the machine tool in a "machining a workpiece" mode of operation, and interrupting the machining of the workpiece that follows a machining program by operating the multifunction pushbutton.

9. The method of claim 8, further comprising unlocking a lock on manual protective doors, opening at least one automatic protective door, or deactivating a monitoring of the at least one access region.

10. The method of claim 9, further comprising indicating the interruption of the machining program and the opening of the automatic protective doors or the deactivation of the at least one access region by extinguishing a first state signal previously output from the multifunction pushbutton.

11. The method of claim 9, further comprising continuing to interrupt the machining program by operating the multifunction pushbutton, which closes the automatic protective doors or activates the at least one access region.

12. The method of claim 11, wherein the multifunction pushbutton indicates the closure of the automatic protective doors or the activation of the at least one access region by outputting a second state signal, the multifunction pushbutton being operable to output the second state signal and output a different first state signal.

13. The method of claim 11, wherein operating the multifunction pushbutton again continues the interrupted machining program.

14. The method of claim 8, further comprising indicating interruption of the machining program and the unlocking of at least one manual protective door of the protective housing by outputting a second state signal from the multifunction pushbutton, and extinguishing the second state signal from the multifunction pushbutton when the at least one manual protective door is opened, the multifunction pushbutton being operable to output the second state signal and output a different first state signal.

15. The method of claim 14, further comprising continuing the machining program by closing the at least one opened manual protective door and then locking the at least one manual protective door by operating the multifunction pushbutton.

16. The method of claim 15, wherein operating the multifunction pushbutton again continues the interrupted machining program.

17. The method of claim 14, wherein the multifunction pushbutton indicates the locking of the at least one manual protective door by outputting the second state signal.

18. The method of claim 17, further comprising indicating the continuation of the machining program by changing an output of the multifunction pushbutton from the second state signal to the first state signal.

19. The method of claim 1, further comprising loading and unloading workpieces from a loading compartment into the machining compartment with at least one workpiece transporting apparatus.

20. The method of claim 19, wherein operating the multifunction pushbutton during the change of workpiece stops the at least one workpiece transporting apparatus, and operating the multifunction pushbutton again restarts it.

21. The method of claim 1, further comprising operating the machine tool in a "setting up a machine tool" mode of operation, wherein operating the multifunction pushbutton actuates the work steps of moving the workpiece transporting apparatus from a loading compartment into the machining compartment or from the machining compartment into the loading compartment.

22. The method of claim 21, wherein, as an additional work step, opening or closing of the access region is controlled by operating the multifunction pushbutton.

23. The method of claim 1, wherein the remaining individual consecutive work steps are initiated in a decentralized way by the one or more multifunction pushbuttons or centrally on the main control panel.

* * * * *